Patented May 25, 1943

2,319,902

UNITED STATES PATENT OFFICE 2,319,902

THERAPEUTIC PRESSOR COMPOSITION AND METHOD OF PREPARING IT

Oscar M. Helmer, Indianapolis, Ind., assignor to Eli Lilly and Company, Indianapolis, Ind., a corporation of Indiana No Drawing. Application October 5, 1940, Serial No. 359,913

6 Claims. (Cl. 167—74)

This invention relates to therapeutic compositions and to methods of preparing these compositions.

The compositions of this invention when administered in physiological doses cause a rise in arterial blood pressure without producing a decrease in the flow of blood to the skin with its consequential fall in skin temperature. This unique hemo-dynamic property is a decided advantage over that possessed by other substances heretofore used in the treatment of states of hypotension resulting from surgical shock. For example, epinephrine can be used to raise the arterial blood pressure in hypotensive states, but it has the disadvantage of producing a drop in skin temperature which in some cases causes aggravation of the condition of the patient. As an example of the efficacy of the compositions of this invention, one such composition, when administered intravenously to dogs, raises the arterial blood pressure 29% above the normal level but does not decrease the skin temperature.

The compositions of this invention comprises the reaction products of kidney, such as that obtained from sheep, hogs, or any other warm-blooded animal, which possesses pressor characteristics when administered intravenously to dogs, or an aqueous extract of kidney which possesses pressor characteristics when administered intravenously to dogs with a substance derived from blood. The compositions of this invention also include the salts of these reaction products. These reaction products are soluble in water, alcohol, and propylene glycol. They are substantially insoluble in ether, petroleum ether, butyl alcohol, and amyl alcohol, both in acid and alkaline media. These reaction products are not destroyed by boiling for one hour in a water solution having a pH of 1.0, but are destroyed in a water solution having a pH of 10.0.

The compositions of this invention may be prepared by the following method:

Substances contained in kidney which possess pressor characteristics when administered intravenously to dogs are reacted with human or animal blood or a derivative of the blood of humans or animals. While kidney may be reacted directly with blood or the derivative of blood, it is desirable, instead of employing kidney itself, to extract the substances having the pressor characteristics with water and utilizing the water extract for the reaction. In the event that kidney is employed, it is preferably comminuted to a fine state and treated with blood or a derivative of blood, such as plasma, serum, pseudoglobulin, or red cells. If an extract is used, the extract is mixed with blood or the derivative of blood and incubated at a temperature below that at which the proteins contained in the blood, derivative of blood, or the extract are coagulated. Desirably this temperature is below 60° C. and is preferably maintained between 37° and 40° C. The time of incubation depends upon the temperature employed, i. e., the higher the temperature the shorter the period of incubation. The optimum time for a particular temperature can be determined by pharmacological tests. For securing the maximum yield and most effective reaction product, the period of incubation should not exceed the optimum time revealed by these tests. In the event that the optimum time is exceeded, the reaction product is gradually destroyed. This fact can be ascertained by pharmacological tests. After the incubation, the reaction is terminated by any suitable means. For example, this termination may be effected by heating the mixture to a temperature of approximately 100° C. for a relatively short period of time—of the order of five minutes if the volume is less than two liters. Alternately, the action may be terminated by the addition of a suitable chemical substance, such as alcohol or acetone, which inactivates or precipitates some of the constituents which produce the reaction product. The insoluble material which is formed in terminating the reaction is separated by any suitable means, such as centrifugation or filtration, from the liquid in the mixture and discarded. In the event that a chemical substance for terminating the reaction is employed, it is preferably removed by suitable means, such as evaporation. The liquid, after separation from the insoluble material, contains the reaction product. The reaction product may be purified by evaporation to dryness and the dry residue extracted with a suitable solvent, such as alcohol, glacial acetic acid, or 90% phenol. The insoluble material is separated and discarded. The solution may then be evaporated to dryness and again extracted. As an alternate method of purification, a solution of the reaction product may be precipitated with ether or acetone or other volatile organic material in which the reaction product is insoluble. The precipitate formed after the addition of the volatile organic material is dissolved in water.

Salts of this reaction product are formed by treating the reaction product with the appropriate acid, for example, a monocarboxylic acid, such as acetic acid, a dicarboxylic acid, such as oxalic acid, or an inorganic acid, such as the hydrohalogen acids and sulfuric acid, or with compositions having a relatively high hydrogen ionization constant, such as picric acid. The salt may be isolated from the mixture by any suitable means, such as evaporation to dryness or the addition of a sufficient quantity of a liquid in which the salt is substantially insoluble.

The optimum time and the most desirable temperature or range of temperatures for reacting the extract of kidney which possesses pressor characteristics with the blood or derivative of blood is determined pharmacologically. Several samples of mixtures of the reactants are prepared and subjected to the various temperatures for varying periods of time, immediately after which each sample is immersed in boiling water to terminate the reaction. Preferably, for purposes of this test, the reactants are mixed in a centrifuge tube and after the termination of the reaction each sample is centrifuged. A coagulum is collected at the bottom of each tube and the supernatant liquid is injected intravenously into laboratory animals, such as cats or dogs. The arterial blood pressure of the animal is observed after this injection and the reaction mixture manifesting the highest rise would indicate the optimum time and temperature to be employed for the preparation of the reaction products of this invention.

The most desirable proportions of the kidney extract and blood or derivative of blood is determined in a somewhat similar manner. Equal quantities of the blood or derivative of blood are placed in a series of centrifuge tubes and different quantities of the extract of kidney are placed in each of these tubes. The tubes are all subjected to the desired temperature for the same period of time and then immersed in boiling water for a period of five minutes, which terminates the reaction. The contents of the tubes are then centrifuged and aliquot portions of the supernatant liquid are injected into suitable laboratory animals to determine the effect of each sample on the arterial blood pressure of that animal. The sample producing the highest blood pressure would indicate the most desirable proportions of the kidney extract and blood or derivative of blood to be employed.

Although the most desirable proportions of reactants are preferably treated at the temperature and for the time indicated by these tests, satisfactory reaction products are obtained by deviating from the optimum conditions revealed by the tests.

Typical methods for the preparation of the compositions of this invention are as follows:

*Example 1.*—200 cc. of pseudoglobulin solution are diluted with an equal volume of .9% sodium chloride solution. To this mixture are added 10 cc. of an aqueous extract of kidney, which extract possesses pressor characteristics when administered intravenously to dogs.

The solution of pseudoglobulin is prepared from ox serum by fractional precipitation, using potassium phosphate as a precipitant. The inactive substances in the ox serum are removed by adding sufficient potassium phosphate to the ox serum to produce a 1.5 molar concentration. This end is most conveniently achieved by the use of a 3 molar potassium phosphate solution which has a hydrogen ion concentration of pH 6.5, which comprises equal molecular amounts of potassium hydrogen phosphate and potassium dihydrogen phosphate. The precipitate which is formed as a result of adjusting the phosphate concentration to 1.5 molar is removed and discarded. By raising the phosphate concentration of the filtrate to a 2 molar solution of the potassium phosphate, most of the pseudoglobulin is precipitated. This precipitate is dissolved in water and dialyzed in Cellophane sacs against running tap water. The precipitate which forms in the sacs is discarded and the residual solution which contains the pseudoglobulin may be used to prepare the desired product. If desired, the pseudoglobulin may be further purified by repeating the precipitation with a 2 molar potassium phosphate solution. Whether the pseudoglobulin is purified or not, the concentration of the water solution thereof is desirably adjusted so that 100 cc. is equivalent to one liter of ox serum.

The aqueous solution of kidney which possesses pressor characteristics when administered intravenously to dogs is prepared in accordance with the method described by Helmer and Page in the Journal of Biological Chemistry, vol. 127, p. 757, 1939. When injected intravenously into an unanesthetized dog, 0.025 cc. of this kidney extract per kilo of body weight of dog produces a rise in arterial blood pressure of 30 mm. or more, as measured by a mercury manometer connected to an intra-arterial cannula.

The mixture of pseudoglobulin and aqueous extract of kidney is incubated at 40° C. for a period of ten minutes. The reaction is terminated by immersing the flask containing the mixture in boiling water for five minutes. The period of incubation is ascertained empirically by the pharmacological tests heretofore described. During this period of incubation the desired reaction product is formed and the coagulum which is produced by immersing the flask in boiling water is thrown down by centrifuging. The coagulum is extracted twice with warm 95% ethyl alcohol. The coagulum is then discarded. The supernatant liquid and extraction of the coagulum are combined and evaporated to dryness under reduced pressure. The residue is extracted with anhydrous ethyl alcohol or 95% ethyl alcohol and the extract filtered through paper. The alcohol is evaporated on a steam bath with the aid of a current of air or in vacuo. The residue is dissolved in water and extracted in a separatory funnel with ethyl ether. The aqueous phase contains substantially all of the reaction product. The ether dissolved in the aqueous phase is removed by heating on a steam bath. A few drops of glacial acetic acid are added to bring the pH of the solution to approximately 3.5. The solution is heated on a steam bath for about fifteen minutes and then placed in a refrigerator at a temperature of approximately 5° C. for one to two hours. A gum-like material forms which is filtered off. The filtrate, which contains the desired reaction product, is made up to 25 cc. with water. This solution may be employed therapeutically.

*Example 2.*—Example 1 is repeated, except that instead of terminating the reaction by heat, sufficient ethyl alcohol is added to coagulate some of the inert proteins and terminate the reaction. Usually about four volumes of ethyl alcohol are required for this purpose. Desirably, the ethyl alcohol is warmed. The insoluble material formed is separated by any suitable means, such as by filtration. The insoluble material is extracted with ethyl alcohol to remove any of the desired reaction product. The extract together with the filtrate are combined and the alcohol is removed by evaporation to dryness in vacuo.

The residue is dissolved in water and any insoluble matter removed. This water solution contains the desired reaction product and may be used therapeutically to raise the arterial blood pressure. If desired, the reaction product may be purified by dissolving the residue in alcohol instead of water. Any insoluble matter is removed and the remaining liquid is again evaporated to dryness. This procedure may be repeated until finally the residue may be dissolved in water. This latter water solution is further purified by treatment with approximately an equal volume of butyl alcohol. The butyl alcohol and water solution are agitated and the water phase contains the desired reaction product. The butyl alcohol phase is removed and the water solution again extracted with one half its volume of butyl alcohol. The mixture is then agitated, the butyl alcohol removed, and the water phase again treated with one quarter of its volume of butyl alcohol. In order to insure as complete a yield of the reaction product as possible, all the butyl alcohol fractions are combined and extracted with water. The water extract is combined with the water solution containing the reaction product and shaken with ethyl ether to remove any butyl alcohol in the water solution. The water phase may be either evaporated to dryness and the residue redissolved, or the ethyl ether may be removed by vacuum distillation, or it may be treated for further purification or for the production of derivatives, such as salts of the reaction product. In the event that the ether is removed, the water solution may be used therapeutically.

*Example 3.*—The water solution obtained after treatment with butyl alcohol and ether, as described in Example 2, may be reacted with a suitable acid to form the desired salt. For example, this water solution of the reaction product is evaporated to dryness in vacuo. The residue is extracted with three 50 cc. fractions of ethyl alcohol, any insoluble material is filtered off and the filtrate is concentrated to about 50 cc. of its former volume. About 10 cc. of a saturated alcoholic solution of picric acid are added to the filtrate. About five or six volumes of ethyl ether are then added. The precipitate which is formed is filtered off and washed with ether. The precipitate may be dissolved in water and used therapeutically. If further purification is desired, it may be recrystallized from a suitable organic solvent, such as ethyl alcohol. Other salts may be formed in a similar manner, such for example as the acetic acid derivative and the phosphotungstic acid derivative. In this case of the acetic acid derivative, the water containing the reaction product obtained in Example 1 is evaporated to dryness and the residue extracted with three 50 cc. fractions of glacial acetic acid. Approximately five or six volumes of ethyl ether are added to the extract. The precipitate formed is washed with ethyl ether and dissolved in water; or if a more purified product is desired, it is dissolved in glacial acetic acid and the above procedure repeated.

In the case of the phosphotungstic acid derivative, the water solution containing the reaction product obtained in Example 1 is treated with phosphotungstic acid and the resulting precipitate, which is the phosphotungstic salt of the reaction product, is separated by filtration. If the reaction product is desired from this salt, it may be obtained by decomposing the salt with barium hydroxide. The barium phosphotungstate formed is removed by centrifuging and the excess barium by the addition of sulfuric acid.

*Example 4.*—If a more purified reaction product is desired, it may be obtained by first preparing a derivative of the reaction product, as outlined in Example 3, and subsequently dissolving the derivative in water, if water-soluble, or other suitable solvent, such as ethyl alcohol. Subsequently a strong mineral acid, such as sulfuric acid, is added until a distinctly acid reaction in the solution is obtained. The acid which was combined to form the derivative and which is liberated in this reaction is removed by any suitable means, such as by dissolving it in a solvent in which the reaction product is substantially insoluble. For example, the picric acid derivative is first formed and this derivative is treated with sulfuric acid until the solution is strongly acid. The mixture is then extracted with equal volumes of ethyl ether until substantially all of the picric acid has been removed. This condition is readily ascertained by noting the color of the ether. When substantially no picric acid is contained in the extract, the ether remains colorless. Sufficient barium hydroxide is added to the water phase to precipitate substantially completely all of the sulfate contained in the water solution. An excess of barium hydroxide is avoided. The amount of barium hydroxide required can readily be determined by analysis. The precipitate of barium sulfate which is formed is filtered and the filtrate may be used therapeutically. If a dry product is desired, the filtrate may be evaporated to dryness.

*Example 5.*—Another method of purifying the reaction product is to treat the water solution of the reaction product obtained in Example 2 with an adsorbent, such as carbon, charcoal, fuller's earth, clay, silica, or alumina. For example, the water solution containing the reaction product obtained in Example 2 is treated with sufficient charcoal to adsorb substantially all of the reaction product so that the solution does not possess any fluorescence when subjected to ultra violet light. The mixture is then filtered and washed with water. The filtrate and washings are discarded and the reaction product is eluted from the charcoal with an eluting medium such as glacial acetic acid. The mixture is filtered and the charcoal is again treated with the eluting medium to insure a greater yield of the resulting product. The reaction product is separated by the addition of ethyl ether to the reaction mixture. The precipitate is separated and washed with ethyl ether. It is dissolved in water and the water solution may be used therapeutically. If a dry product is desired, it may be evaporated to dryness. Alternately, the eluted solution is evaporated to dryness to produce the acetic acid derivative of the reaction product. This acetic acid derivative may be dissolved in water and used therapeutically.

*Example 6.*—Approximately 20 cc. of dog serum are mixed in the cup of an ultra filter with 1 cc. of an aqueous extract of kidney possessing pressor activity and prepared in accordance with the method described in the Journal of Biological Chemistry, supra. The cup is fitted with a 4% collodion membrane. The mixture is filtered for about fifteen minutes at room temperature and for forty-five minutes at a temperature of about 5° C. The desired reaction product passes through the membrane and the filtrate may be used therapeutically. The reaction is terminated by the passage of the desired reaction product through the ultra filter.

The reaction products produced in the methods outlined in the specific examples, but not necessarily the salts of derivatives of these reaction products, are soluble in water, alcohol, and propylene glycol, and insoluble in ether, petroleum ether, butyl alcohol, iso-amyl alcohol, and amyl alcohol, both in acid and alkaline media. These reaction products are not destroyed by boiling for one hour in a water solution having a pH of 10. These reaction products are fluorescent when exposed to ultra violet light.

What is claimed is:

1. A composition selected from the class which consists of the reaction products of a substance derived from kidney and having pressor characteristics when administered intravenously to dogs with a substance selected from the class consisting of whole blood, plasma, serum, pseudoglobulin, and red cells; and the salts of said reaction products.

2. A reaction product of a substance derived from kidney and having pressor characteristics when administered intravenously to dogs with a substance selected from the class consisting of whole blood, plasma, serum, pseudoglobulin, and red cells.

3. A salt of a reaction product of a substance derived from kidney and having pressor characteristics when administered intravenously to dogs with a substance selected from the class consisting of whole blood, plasma, serum, pseudoglobulin, and red cells.

4. A reaction product of an aqueous extract of kidney which possesses pressor characteristics when administered intravenously to dogs with a substance selected from the class consisting of whole blood, plasma, serum, pseudoglobulin, and red cells.

5. A reaction product of a pseudoglobulin fraction of blood and an aqueous extract of kidney which possesses pressor characteristics when administered intravenously to dogs.

6. The method of preparing a therapeutic composition which comprises reacting a substance selected from the class which consists of whole blood, plasma, serum, pseudoglobulin, and red cells with a material selected from the class which consists of kidney and an extract of kidney, said kidney and said extract containing constituents which possess pressor characteristics when administered intravenously to dogs, at a temperature between 37° and 40° C., for approximately ten minutes.

OSCAR M. HELMER.